May 2, 1944.  O. A. CARNAHAN  2,347,663

HYDRAULICALLY BALANCED BEARING

Filed Nov. 2, 1939  3 Sheets-Sheet 1

Patented May 2, 1944

2,347,663

UNITED STATES PATENT OFFICE 2,347,663

HYDRAULICALLY BALANCED BEARING

Orson A. Carnahan, Syracuse, N. Y.

Application November 2, 1939, Serial No. 302,537

5 Claims. (Cl. 308—9)

My invention relates to hydraulic bearings for pumps or motors but more particularly to means for reducing friction in these or other machines.

It is an object of my invention to provide an improved arrangement in a multiple, radial cylinder fluid pump or motor having opposed cylinders which results in balancing the forces to minimize the frictional losses.

A further object of this invention is to provide bearings for fluid pumps or motors or other machines which will be exceptionally simple and perfectly lubricated.

Another object is to provide a bearing in which the lubricant film thickness will be maintained independently of the load.

Another object is to provide a bearing of extremely compact size for a given bearing load, the size being limited only by the strength of the materials used in its construction.

A further object is to provide a bearing of extremely high efficiency and practically unlimited life.

Figure 1:
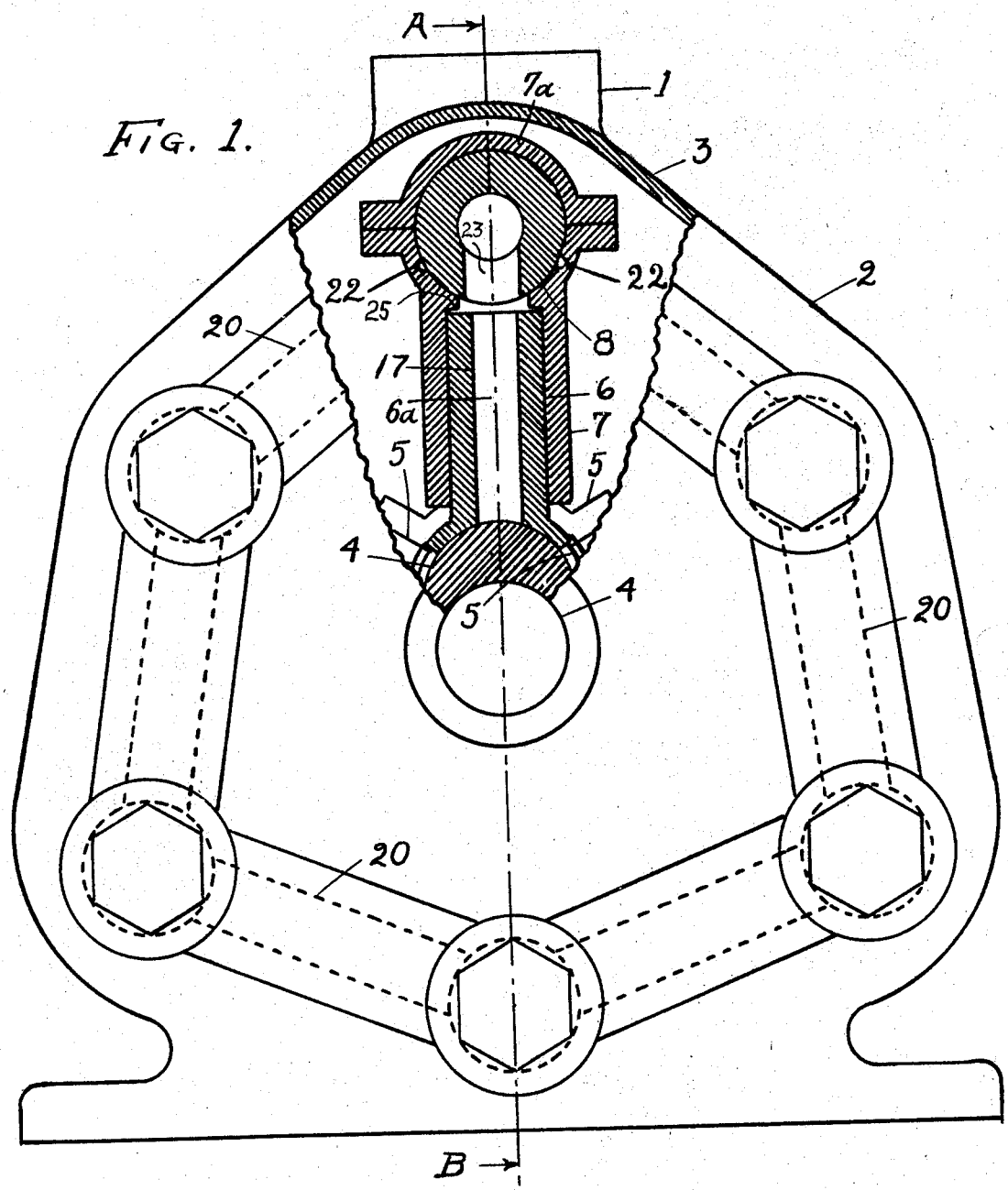
Figure 2:
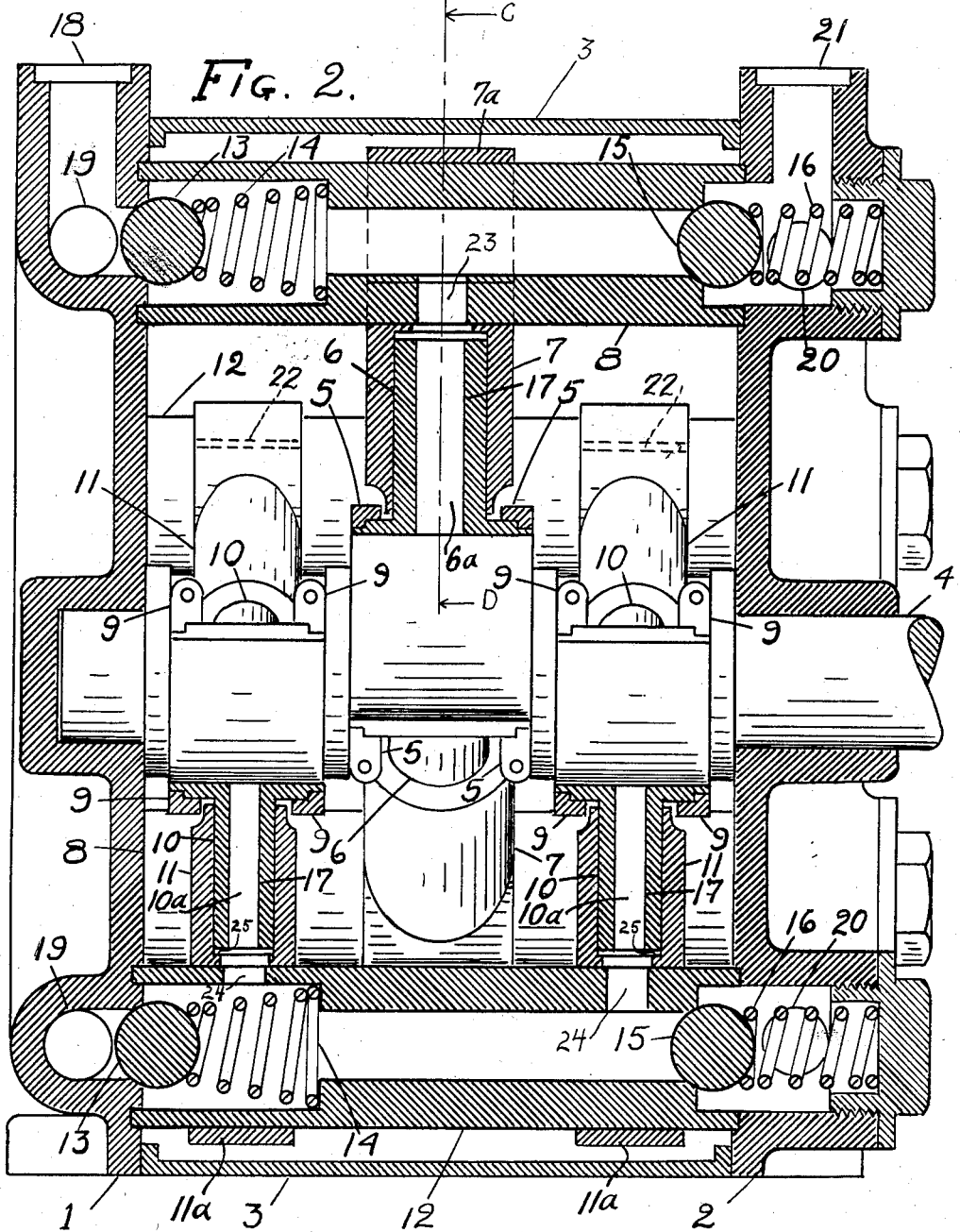
Figure 3:
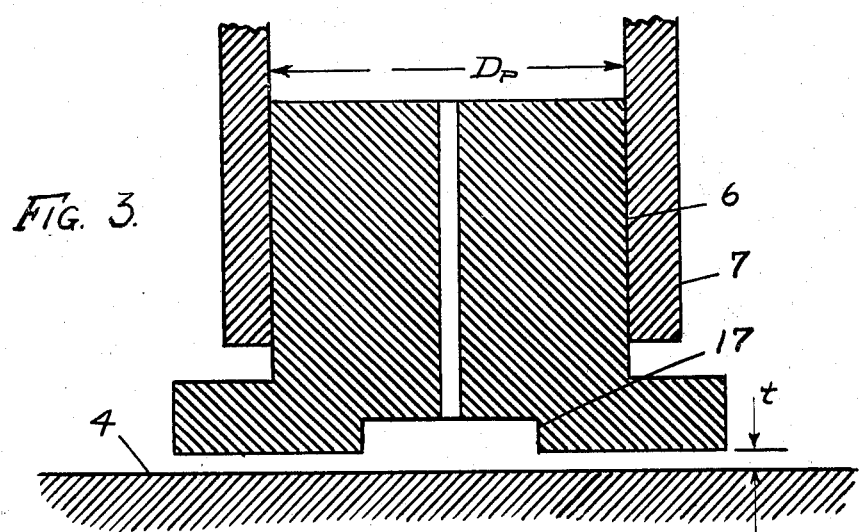
Figure 4:
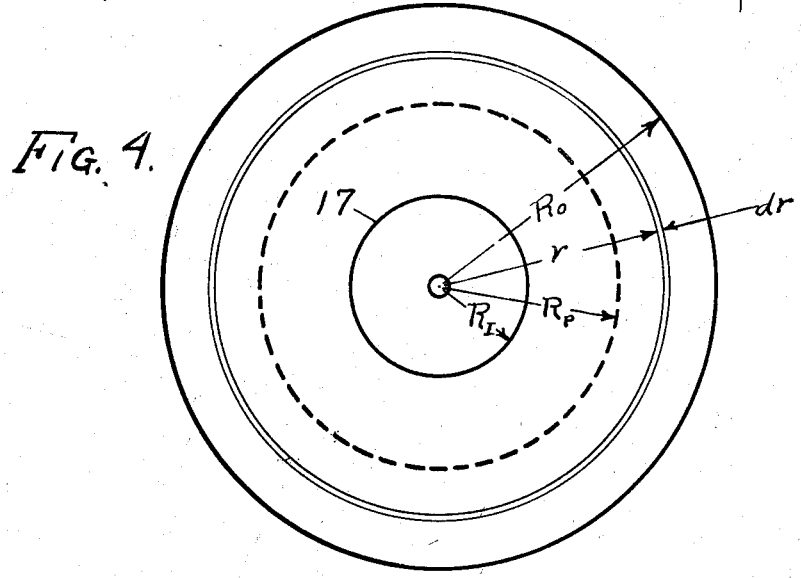
Figure 5:
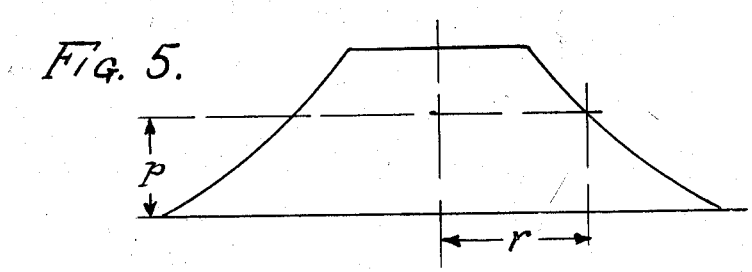

My invention will be better understood from the following drawings taken in connection with the accompanying specification and mathematical equations, and the features of novelty which characterize my invention will be pointed out with particularity in the claims annexed to and forming a part of this specification. Figure 1 is a side view of a multiple, radial cylinder pump partly in section along the line C—D of Fig. 2 to show one crank throw, plunger, oscillating cylinder, and cylinder head or valve chest. Figure 2 is a section taken along the line A—B of Figure 1. Figures 3, 4 and 5 are diagrammatic sketches showing a simple exemplification of the principles involved and the distribution of pressure over an equivalent bearing area. Figure 4 is a vertical projection of Figure 3 and Figure 5 is a pressure diagram along a diameter of Figure 4.

Referring to Figs. 1 and 2 the pump consists of a main housing having end sections 1 and 2 and a spacer section 3 held together by bolts or other fastenings not shown. The mechanism within this housing consists of a three-throw crank shaft 4. Held to the center-throw of this crank shaft 4 by the section rings 5 (three sections each) are three large plungers 6. These plungers reciprocate in three cylinders 7 each of which is mounted at its outer end to oscillate on a valve chest 8. Reference numeral 7ª represents cap means for supporting the cylinder 7 in contact with valve chest 8. The three valve chests 8 are held in symmetrical spaced relationship about the crank shaft 4 by the end sections 1 and 2. Similarly, three smaller plungers 10 are held to each of the end throws of crank shaft 4 by the sectional rings 9 and each of these smaller plungers 10 reciprocates in a cylinder 11. Cylinders 11 are mounted to oscillate on the valve chests 12 which are held in symmetrical spaced relationship about the crank shaft by the end sections 1 and 2 and diametrically opposite to valve chests 8. Reference numeral 11ª disclosed in Figure 2 is directed to the cap means for supporting the cylinder 11 in contact with valve chest 12. Six intake valves 13, one for each of the valve chests 8 and 12, are held against their seats in the intake end section 1 by the valve springs 14. Six discharge valves 15 are likewise held against their seats in the valve chests 8 and 12 by the springs 16.

The intake ends of all of the valve chests 8 and 12 are connected through a manifold passage 19 in the end section 1, which in turn is connected to the pump intake connection 18. The discharge ends of all of the valve chests 8 and 12 are connected through a manifold passage 20 in the end section 2, which in turn is connected to the pump outlet 21. Ports 23 connect the valve chests 8 to the cylinders 7 and ports 24 connect the valve chests 12 to the cylinders 11.

It will be noted that each of the plungers 6 and 10 are hollow throughout their length whereby compression of a fluid in any one of the cylinders 7 and 11 will cause a fluid pressure to be exerted directly on the surface of the crank throw to which the plunger is attached. The purpose of this arrangement will be hereinafter described.

Furthermore, it will be noted that each of the cylinders 7 and 11 have a circumferential shelf or step near the valve chest end and that an axial groove 22 is cut in the bearing face of each of the cylinders 7 and 11 where the cylinders bear on the valve chests 8 and 12. These steps 25 and grooves 22 will be further referred to hereinafter in describing the operation of the pump.

The operation of the pump is as follows: Rotation of the crank shaft causes the plungers 6 and 10 to reciprocate relative to their respective cylinders 7 and 11. As these plungers recede, fluid enters the cylinders by way of the intake connection 18, the intake passage 19, the intake valves, the valve chest passages, and the ports 23 or 24. This fluid is then discharged as the plungers advance leaving by way of the ports 23 or 24, the valve chest passages, discharge valves 15, discharge passage 20, and discharge connection 21. The flow is continuous and nearly uniform due to the overlapping of the intake strokes and discharge strokes.

As pointed out above, plungers 6 and 10 are hollow as is indicated by the opening or passageway 6ᵃ and 10ᵃ so that the pressure in the cylinders acts directly on the crank throw as well as on the end area of the plungers. This reduces the thrust which must be exerted by the plungers 6 and 10 and correspondingly reduces the load that is carried by the lubricating film between the plunger bearing surface and the crank throw. The area of the cavity in each of the plungers 6 and 10 is so designed that the total force due to the pressure acting on the cylinder area is balanced by the product of the pressure in the cylinder acting on the area of the cavity and the product of the mean pressure acting on the lubricating film and the area of the lubricating film. This arrangement prevents the thinning of the oil film as load is applied to the bearing.

As indicated in Figure 2, the area of one plunger 6 is made equal to the area of the two opposing plungers 10. In the illustrated embodiment the stroke of the smaller cylinders has been shown as less than that of the larger cylinders. In order to give parallel thrusts, as between the one large plunger and the two opposing smaller plungers, the ratio of stroke to the distance from the center of the crank shaft to the center of oscillation of the cylinder is made the same in the case of the small cylinders and the opposing large cylinders in order to give equal angles of oscillation for the opposing cylinders. This arrangement balances the thrusts on the crank shaft, thus eliminating any unbalanced thrust which would otherwise have to be carried by the main bearings in end sections 1 and 2.

Grooves 22 are provided in the cylinders 7 and 11 (see Figure 1) to limit the extent of the high pressure lubricating film area in the cylinder bearings on the valve chests 8 and 12 and thus prevent these bearings from floating away from the valve chests 8 and 12 on the cylinder side which would otherwise give excessive leakage and cause a squeezing out of the lubricating film on the back side between the valve chests 8 and 12 and the respective bearing caps.

As pointed out above, by properly designing the areas of the bore, the plunger, and the plunger bearing surface area, it is possible to maintain a practically constant lubricating film thickness regardless of the bearing loads, as will be more specifically demonstrated in the mathematical discussion which follows.

Referring to Figure 3, let us assume we have a cylinder 7, and a plunger 6 positioned therein, the plunger being supported by the surface 4. A cavity 17 (equivalent to the bore in plungers 6 and 10 of Fig. 2) is provided in the bearing face of plunger 6 and connected to the space above the plunger 6 by an axial bore. Now, if a fluid is compressed in cylinder 7 by plunger 6, the pressure in cylinder 7 will be communicated to the cavity 17 underneath the foot of the bearing. The total force against the surface 4 (which is equivalent to the crank throw in Fig. 2) is equal to (1) $$F_p = \pi R_p^2 P_1$$

where $R_p$ is radius of plunger and $P_1$ is pressure in lbs./in.² in the cylinder.

Referring to Fig. 4 which is a representation of the circular equivalent of the bearing face of the plunger on the surface 4, the force against the surface 4 is equal to the sum of the constant pressure $P_1$ times the area of the cavity 17 whose radius is $R_I$, and the mean film pressure times the area $\pi(R_o^2 - R_I^2)$; where $R_o$ is the outside radius of the foot of the bearing and $R_I$ is the radius of the cavity, and the mean film pressure is the total force exerted by the film divided by the area over which it acts.

The drop in pressure in any conduit is given by the simple formula—

$$dP = kV^n dr$$

where $dP$ equals drop in pressure in a distance $dr$ measured in the direction of flow, and $V$ equals the velocity of flow. In the case of flow outward from the cavity 17 to the outside edge of the bearing face of the plunger 6, $k$ and $n$ are constants depending chiefly upon the condition of the surfaces, viscosity of the fluid and the thickness of fluid film $t$. When $t$ is relatively large the flow becomes turbulent and $n$ is approximately equal to 2; on the other hand, if $t$ is relatively small we have viscous flow and $n$ is approximately equal to one.

Assuming that we have viscous flow and using $n=1$ the general equation—

(2) $$dP = kV^n dr$$

becomes (3) $$dP = kV dr$$

since the area at any radius $r$ is $2\pi rt$ (4) $$Q = 2\pi r t V$$

$Q$ being the quantity of flow; therefore $$V = \frac{Q}{2\pi t r} = \frac{c}{r}$$

$c$ being a constant equal to $$\frac{Q}{2\pi t}$$

substituting $c/r$ for $V$ in (3) gives—

(5) $$dP = kc \frac{dr}{r} = K \frac{dr}{r}$$

and integration gives—

(6) $$P = K \log r$$

substituting limits $$P_I = K \log \frac{R_o}{R_I}$$

and (7) $$K = \frac{P_I}{\log \frac{R_o}{R_I}} = \frac{P_I}{\log N}$$

where—

$$N = \frac{R_o}{R_I}$$

therefore (8) $$P = \frac{P_I}{\log N} \log \frac{R_o}{r} = \frac{P_I}{\log N}(\log R_o - \log r)$$

and the force on the differential area $dA$ is (9) $$dF = P dA = \frac{2\pi P_I}{\log N}(\log R_o \cdot r dr - \log r \cdot r dr)$$

Integrating, substituting limits, and adding $\pi R_I{}^2 P_I$ (the force due to the cavity pressure) gives—

(10)
$$F_v = \pi R_I{}^2 P_I \left( \frac{N^2-1}{2 \log N} - 1 \right) + \pi R_I{}^2 P_I$$

(11)
$$F_v = \pi R_I{}^2 P_I \left( \frac{N^2-1}{2 \log N} \right)$$

where $F_v$=the force due to cavity pressure plus the viscous film pressure.

If the proportions are made such that $F_p$ (1) is equal to $F_v$ (11) the forces will be balanced and there will be no tendency to change the thickness of the lubricant film with change of pressure.

Assuming $N=2$ (turbulent flow)

(12)
$$dP = kV^2 dr = \frac{K dr}{r^2}$$

integrating, $$P_I = K\left(-\frac{1}{r}\right)\frac{R_o}{R_I}$$

$$K = \frac{P_I R_o R_I}{R_o - R_I}$$

and $$P = \frac{P_I R_o R_I}{R_o - R_I}\left(\frac{1}{r} - \frac{1}{R_o}\right)$$

The force on the differential area $dA$ is

(13)
$$dF = PdA = \frac{P_I R_o R_I}{R_o - R_I}\left(\frac{1}{r} - \frac{1}{R_o}\right) 2\pi r dr$$

Integrating, substituting limits, and adding $\pi R_I{}^2 P_I$ (cavity pressure) gives

(14) $\qquad F_t = \pi R_I{}^2 P_I N$ where $F_t$ equals the force due to cavity pressure and turbulent film pressure.

If the proportions are made such that $F_t = F_p$ there would be no tendency for the film thickness to change with changes of pressure under these conditions of turbulent flow.

By means of these equations it may be shown that a bearing having a cavity ½ inch in diameter and an outside diameter of 2 inches under conditions of turbulent flow will support a load equivalent to a one inch plunger without thinning the lubricating film. With viscous flow the same bearing will support a load equivalent to a 1.16 inches plunger. It is evident, therefore, with a plunger having a diameter greater than 1 inch and less than 1.16 inches, that the lubricating film would be automatically adjusted until the flow is partially turbulent but still gives perfect flotation.

In the same manner as above set forth for the simple equivalent bearing shown in Figs. 3 and 4, the proper proportions for plunger, cavity and thrust surface area may be determined for the plunger bearings on the crank throws in Figs. 1 and 2. Furthermore, the bearings by which the cylinders 7 and 11 are mounted for oscillation on valve chests 8 and 12 may be similarly designed to support the necessary load without thinning of the lubricating film. In this case the area of the step 25 near the valve chest end of the cylinder has to be proportioned with regard to the area of the bearing face of each of the cylinders, as defined by the small diameter opening from the cylinder to the valve chest on the one hand and the grooves 22 on the other hand. The grooves 22 being open to the atmosphere, fix the lower limit of pressure in the lubricating film in this bearing whereas the higher limit is fixed by the pressure $P_I$ in the cylinder. The pressure exerted against the step 25 acts to balance the pressure exerted by the lubricating film thus holding the cylinder against the valve chest.

It will be apparent from a consideration of the foregoing calculations that one of the essential factors of my invention is the fact that the pressure in the cavity must always be greater than the mean bearing pressure, which is the total force exerted between the mating surfaces divided by the total supporting area. This is shown graphically by the diagram in Fig. 5 showing a pressure diagram along one diameter of Fig. 4.

Since capillary attraction, and shape and condition of surfaces, etc. all have their influence on the distribution of pressure it is advisable to use the above formulae for preliminary design and then vary the proportions until perfect lubrication (no metallic contact) is obtained with a minimum of leakage.

While I have described my invention particularly in connection with a multiple, radial cylinder pump, it will be obvious to those skilled in the art that in its broadest aspects my invention is not limited to such pumps but is applicable as well to fluid motors by merely substituting a set of mechanical valves for the automatic valves shown. Furthermore, it will be understood that while the improved flotation bearing shown and described in connection with my improved pump, combines with my improved arrangement and proportioning of cylinders and plungers whereby the thrusts exerted on the crank shaft are balanced, to provide a pump having a crank shaft which literally floats in space with relation to the crank bearings and hence exerts practically no load on the main bearings; nevertheless, this bearing is also applicable to many other mechanisms by simply varying the method of supplying the lubricant or altering the form and proportions of the engaging elements. I therefore desire to cover all such modifications as fall within the scope of my invention which is set forth in the appended claims.

What I claim as new, and desire to secure by Letters Patent of the United States, is:

1. In a bearing, a plurality of relatively movable members having mating surfaces in engagement over a bearing area, a cavity provided in the engaging surface of one of said members, means comprising a passageway for supplying said cavity with a lubricant under pressure, means for applying a lubricant to one of said members under pressure which creates a force tending to move said member towards a second member, said first-mentioned means also serving to apply a lubricant pressure between said engaged members which creates a force equal to said aforementioned force tending to separate said members, said latter force comprising a force created within the said cavity by said lubricant pressure and a force between said movable members external of said cavity.

2. In a bearing, a plurality of relatively movable elements having mating surfaces, a lubricant under pressure, the first of said movable elements provided with a first surface against which said lubricant under pressure acts to move the mating surface of said element toward the mating surface of a second movable element, passage means for conveying said lubricant under pressure between said mating surfaces, said first movable element provided with a second surface adjacent the mating surface of said second movable element against which said lubricant under pressure acts tending to move said mating surfaces apart, said second surface of said first movable element having a portion thereof at atmospheric pressure, said first surface and said second surface having areas acted upon by said lubricant under pressure to provide resultant forces which are substantially balanced.

3. In a bearing, a cylindrical element having a bearing surface about the periphery thereof, a second element having a bearing surface mating with said first-mentioned bearing surface, a lubricant under pressure, means comprising a surface on said second element against which the lubricant acts to produce a force which tends to move the bearing surface of the second element toward the bearing surface of the cylindrical element, passage means for conveying said lubricant between said mating bearing surfaces, means comprising the area of said second element adjacent the bearing surface of said cylindrical element and the pressure of said lubricant acting upon said area to produce a force tending to separate said mating surfaces which is equal to said aforementioned force tending to move the bearing surfaces together.

4. A bearing structure consisting of a cylinder, a slidable plunger in telescopic assembly with said cylinder, a bearing surface on one end of said plunger in mating contact with a supporting surface, a head on the other end of said plunger, the area of said bearing surface being greater than the area of said plunger head, and a passage between said plunger head and said bearing surface whereby a fluid pressure at said plunger head may be transmitted to said mating bearing surfaces to maintain a film of fluid therebetween.

5. A bearing structure consisting of a cylinder, a slidable plunger in telescopic assembly with said cylinder, a bearing surface on one end of said plunger in mating contact with a supporting surface, a head on the other end of said plunger, the area of said bearing surface being greater than the area of said plunger head, and a passage through said plunger interconnecting said plunger head and said bearing surfaces, whereby a fluid pressure at said plunger head may be transmitted to said mating surfaces to maintain a film of fluid therebetween.

ORSON A. CARNAHAN.